US010803101B2

United States Patent
Dubyak et al.

(10) Patent No.: US 10,803,101 B2
(45) Date of Patent: *Oct. 13, 2020

(54) RECOMMENDING RESPONSES TO EMERGENT CONDITIONS

(71) Applicant: INTERNATIONAL BUSINESS MACHINES CORPORATION, Armonk, NY (US)

(72) Inventors: William G. Dubyak, Severna Park, MD (US); Edward G. Katz, Washington, DC (US); Nicole M. O'Connor, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/846,290

(22) Filed: Dec. 19, 2017

(65) Prior Publication Data

US 2018/0373784 A1    Dec. 27, 2018

Related U.S. Application Data

(63) Continuation of application No. 15/628,732, filed on Jun. 21, 2017.

(51) Int. Cl.
| | | |
|---|---|---|
| *G06F 16/00* | (2019.01) | |
| *G06F 16/33* | (2019.01) | |
| *G06F 16/335* | (2019.01) | |
| *G06N 5/04* | (2006.01) | |
| *G06N 5/02* | (2006.01) | |
| *G06Q 90/00* | (2006.01) | |

(52) U.S. Cl.
CPC ........ *G06F 16/3331* (2019.01); *G06F 16/337* (2019.01); *G06N 5/022* (2013.01); *G06N 5/045* (2013.01); *G06Q 90/00* (2013.01)

(58) Field of Classification Search
CPC ... G06F 16/3331; G06F 16/337; G06N 5/022; G06N 5/045; G06Q 90/00
See application file for complete search history.

(56) References Cited

U.S. PATENT DOCUMENTS

| | | |
|---|---|---|
| 6,606,544 B2 | 8/2003 | Glenn |
| 7,774,293 B2 | 8/2010 | Mosleh et al. |

(Continued)

FOREIGN PATENT DOCUMENTS

| | | |
|---|---|---|
| EP | 0367544 A2 | 5/1990 |
| WO | 2014127500 A1 | 8/2014 |
| WO | 2016070026 A1 | 5/2016 |

OTHER PUBLICATIONS

Blanco et al., "Causal Relation Extraction," LREC 2008 Proceedings, May 2008, p. 310-313, European Language Resources Association.

(Continued)

*Primary Examiner* — Dinku W Gebresenbet
(74) *Attorney, Agent, or Firm* — Jordan T. Schiller

(57) ABSTRACT

A method for recommending responses to emergent conditions is provided. The present invention may include receiving a query from a user. The present invention may also include retrieving a plurality of recommended responses for the received query from a plurality of entities and a plurality of relations stored in a graph-based knowledge resource. The present invention may further include presenting the retrieved plurality of recommended responses to the user.

5 Claims, 9 Drawing Sheets

(56) References Cited

U.S. PATENT DOCUMENTS

| | | | |
|---|---|---|---|
| 2006/0200010 A1 | 9/2006 | Rosales | |
| 2011/0276832 A1* | 11/2011 | Schneider | G05B 23/0229 714/37 |
| 2012/0158633 A1 | 6/2012 | Eder | |
| 2013/0274992 A1 | 10/2013 | Cheriere et al. | |
| 2013/0275429 A1 | 10/2013 | York et al. | |
| 2014/0250047 A1* | 9/2014 | Bounouane | G06N 7/005 706/52 |
| 2014/0337306 A1 | 11/2014 | Gramatica | |
| 2015/0149215 A1* | 5/2015 | Qian | G06F 19/324 705/3 |
| 2015/0220704 A1* | 8/2015 | Carmeli | G06F 19/3481 705/3 |
| 2015/0332158 A1 | 11/2015 | He et al. | |
| 2015/0356405 A1* | 12/2015 | Sanchez | G06N 5/02 706/12 |
| 2016/0117604 A1 | 4/2016 | Frosst et al. | |
| 2016/0306791 A1 | 10/2016 | Allen et al. | |
| 2017/0076206 A1 | 3/2017 | Lastras-Montano et al. | |
| 2018/0373783 A1 | 12/2018 | Dubyak | |
| 2018/0373785 A1 | 12/2018 | Dubyak | |

OTHER PUBLICATIONS

Bojduj, "Extraction of Causal-Association Networks from Unstructured Text Data," California Polytechnic State University Master's Thesis and Project, Jun. 2009, p. 1-61.

Ernst et al., "KnowLife: a Knowledge Graph for Health and Life Sciences," ICDE Conference, 2014, p. 1254-1257, IEEE.

Gangopadhyay, "Conceptual Modeling from Natural Language Functional Specifications," Artificial Intelligence in Engineering, Apr. 2001, p. 207-218, vol. 15, Issue 2, Elsevier Science Ltd.

Mell et al., "The NIST Definition of Cloud Computing," National Institute of Standards and Technology, Sep. 2011, p. 1-3, Special Publication 800-145.

Pearl, "Causal Diagrams for Empirical Research," Biometrika, 1995, p. 669-710, Technical Report R-218-B, Great Britain.

Pechsiri et al., "Explanation Knowledge Graph Construction Through Causality Extraction from Texts," Journal of Computer Science and Technology, Sep. 2010, p. 1055-1070, vol. 25, No. 5, Springer Science+Business Media LLC & Science Press, China.

Sizov et al., "Automatic Extraction of Reasoning Chains from Textual Reports," Proceedings of the TextGraphs-8 Workshop, Oct. 18, 2013, p. 61-69, Association for Computational Linguistics, Seattle, Washington, USA.

Thwaites et al., "Causal Analysis with Chain Event Graphs," Artificial Intelligence, Aug. 2010, p. 889-909, vol. 174, Issues 12-13, Elsevier B.V.

Yang, "Analytics Meta Learning," Carnegie Mellon University Master's Thesis, May 2017, p. 1-285.

Pease. "The Knowledge Representation Corner: Graphs". Dataversity. Jan. 27, 2016. URL Link: http://www.dataversity.net/the-knowledge-representation-corner-graphs/. Accessed May 2018.

IBM: List of IBM Patents or Patent Applications Treated as Related (Appendix P), May 18, 2020, pp. 1-2.

* cited by examiner

RECOMMENDING RESPONSES TO EMERGENT CONDITIONS

BACKGROUND

The present invention relates generally to the field of computing, and more particularly to cognitive computing.

Recommendations generally involve some element of judgment. For humans, making a recommendation is a reasonably straightforward process. For computers, however, generating recommendations involves a second step, such as a possible optimization of a function, or a system of metrics that enables the computer to select one option over another. For example, statistical engines may select a set of parameters by minimizing the sum of squared residuals or maximizing the likelihood of a function, and recommendation engines may utilize information on a user's past behavior on a website to propose a widget or particular movie. In the absence of that second step, computers may be unable to compete with human subjects.

SUMMARY

Embodiments of the present invention disclose a method for recommending responses to emergent conditions. The present invention may include receiving a query from a user. The present invention may also include retrieving a plurality of recommended responses for the received query from a plurality of entities and a plurality of relations stored in a graph-based knowledge resource. The present invention may further include presenting the retrieved plurality of recommended responses to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
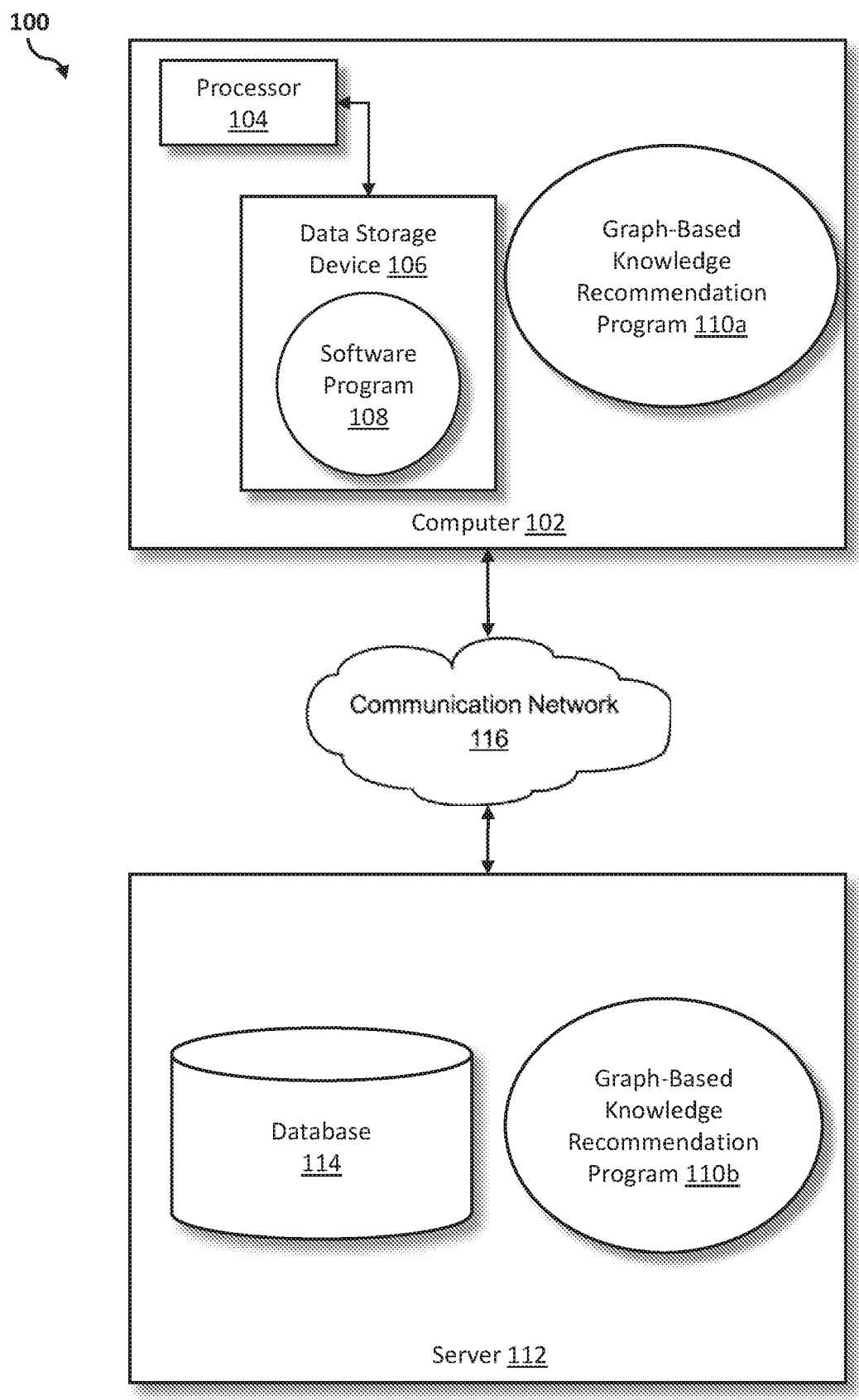
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a method for recommending responses to emergent conditions using a functional and causal graph-based knowledge resource. As such, the present embodiment has the capacity to improve the technical field of cognitive computing by recommending responses to emergent conditions using a function and causal graph-based knowledge resource. More specifically, the present embodiment may utilize a set of statistical methods to extract problems and the associated set of recommendations from technical documents, and store the problems with the associated recommendations for use in response to a search query for an emergent condition.

As described previously, recommendations generally involve some element of judgment. For humans, making a recommendation is a reasonably straightforward process. For computers, however, generating recommendations involves a second step, such as a possible optimization of a function, or a system of metrics that enables the computer to select one option over another. For example, statistical engines may select a set of parameters by minimizing the sum of squared residuals or maximizing the likelihood of a function, and recommendation engines may utilize information on a user's past behavior on a website to propose a widget or particular movie. In the absence of that second step, computers may be unable to compete with human subjects.

The process of generating recommendations becomes more complex when the target of the recommendation is a particular course of action in response to an evolving circumstance. To ask a computer to choose a particular remedy or recommended response involves a mechanism to evaluate one against the other, such as, a system of metrics to rank the order of the possible actions. Technical documents, however, include both a set of problems and the associated set of recommendations, which were produced by human experts and arranged to facilitate learning of a complex system.

Therefore, it may be advantageous to, among other things, provide a method, computer system or computer program product for extracting the problems and associated recommendations from rich technical literature to automatically provide a user with immediate actionable recommended responses to an emerging problem.

According to at least one embodiment, the graph-based knowledge recommendation program may include extracting entity and relationship information directly from technical documents and representing the information in the form of a graph. The information may identify remedies for encoded problems when the graph is built. By traversing the graph, recommended responses, based on the information presented to the problem, may be obtained.

The present embodiment may include the graph-based knowledge recommendation program inferring about the cause and remedy of a problem without human intervention to draw connections. Therefore, the graph-based knowledge recommendation program may operate in the absence of a rules-based response to a problem and dependence on a complex system of metrics that may be optimized over a choice set.

According to at least one embodiment, the application of graph technology may leverage information and provide a quick and reliable mechanism for the graph-based knowledge recommendation program to select the most likely path from the query through the graph to connect the symptom to both a root cause and an appropriate remedy. Additionally, summarizing the information extracted from the technical documents in a graphical model may allow for diverse data sources to feed the overall solution-finding mechanism. According to at least another embodiment, the graph may support root cause analysis of a problem since symptoms and remedies may unite associated systems.

According to at least another embodiment, the graph-based knowledge recommendation program may extract entities (i.e., nodes) and relations (i.e., edges or connections between the nodes) that characterize the causal and functional relations among the systems indicated in the technical and instructional documents. A set of entities and relations may include system component entities (i.e., system components), functional relationships among system components, system component entity states (i.e., system component states), the state of relation between components and their states, the part of relationship between components and subcomponents, causal relationships among these states, actions, remediating relationships between actions and system component entity states, and the contextual states that mediate these relations. Therefore, the graph-based knowledge recommendation program may involve utilizing established natural language processing methods to extract these entities and relations from textual descriptions. In addition, other similar methods may be utilized to extract information from technical drawings and diagrams.

According to at least one embodiment, in order to generate the recommended responses, the graph-based knowledge recommendation program is fundamentally designed to retrieve information from a very large corpus of unstructured text by utilizing known sophisticated natural language processing methods. The solution may include focusing attention on the beginning of the process. As such, instead of searching the corpus and evaluating a set of potential remedies against a set of options found in passages in which another unidentified system of metrics may be involved, the graph-based knowledge recommendation program may utilize the relationships extracted at the time of ingestion for the solution.

According to at least one embodiment, the information utilized to associate problems and solutions may exist within technical literature. The recommended responses generated from the technical literature may be derived from pre-existing knowledge or human expertise, without a machine learning model to rank the possible solutions at run time. No fault trees or prior analysis (e.g., safety studies or accident reports) may be utilized to generate the recommended responses. Therefore, the graph-based knowledge recommendation program may incorporate deep knowledge from technical literature to lay out the connections between causes and context related to complex systems about causes from context. The graph-based knowledge recommendation program may not be dependent on extracting an analysis from a previous event and after the fact reports. Additionally, the graph-based knowledge recommendation program may be utilized as a decision aid that generates advice in near real time to users experiencing an emergent condition.

According to at least one embodiment, the entities and relations from the corpus of unstructured text may be extracted by known extraction technology. The output of the extraction technology (i.e., entities and relations) may be utilized to determine the causes and effects of the problem presented, as well as the appropriate remedy. The extracted entities and relations may be mapped into a knowledge graph, where the nodes are the entities and the edges or links are the relations.

According to at least one embodiment, the technical and instructional documents describe complex systems, for example a commercial aircraft, and describe the relationships between symptoms and responses in these systems. The graph-based knowledge recommendation program may leverage this information and may involve two major sub-methods: (1) a text interpretation sub-method for building an appropriate graph-based knowledge resource for storing information related to functional and causal relations which were derived from documents; and (2) a graph-based knowledge resource query sub-method for querying the graph-based knowledge resource and identifying root causes and recommended responses.

The present embodiment may include a first sub-method of the graph-based knowledge recommendation program which involves building the graph-based knowledge resource from a corpus of technical documents. Initially, the graph-based knowledge recommendation program may parse through a corpus of natural language technical documents describing and related to a single complex system within a domain to extract entities and relationships, which may include system components, system component states, actions, contextual factors, and causal and functional relations among the documents. Next, the identified entities and relationships within the corpus of technical documents may be extracted. Then, a graphical representation (i.e., knowledge graph) of the causal and functional relations may be generated based on the extracted entities and relationships to represent the causal and function structure of the complex system described in the technical documents. The graphical representation (i.e., knowledge graph) may be stored in the graph-based knowledge resource.

The present embodiment may also include a second sub-method of the graph-based knowledge recommendation program which involves querying the graph-based knowledge resource and identifying root causes and remedial actions. Initially, the previously built graph-based knowledge resource may be queried by the user to solve a particular problem. Then, the graph-based knowledge recommendation program may determine whether the graph-based knowledge resource may produce more than one recommended response and, identifying through reverse graph traversal, whether additional relevant symptoms may be dispositive. The user may be prompted to provide additional relevant symptoms present during the emergent condition. Based on whether the user provides the additional relevant symptoms, the graph-based knowledge recommendation program may evaluate the recommended responses and attempt to eliminate all except one recommended response from the graph-based knowledge resource. The graph-based knowledge recommendation program may return the identified recommended responses, or otherwise may return no recommended responses.

According to at least one embodiment, the graph traversal may proceed, by passing through functional and causal relations and a remediating relation, beginning with the query nodes that represent the symptoms, which are a set N of system component state nodes in the graph-based knowledge resource and contextual factors. Then, the graph-based knowledge recommendation program may assemble the set A of action nodes that are related by a remedial relation between one of the system component states in N, which are consistent with the contextual factors. If A is non-empty, then the traversal may end and return set A of recommended responses, or otherwise, may continue the traversal. Then, for each node n in N, each causal or functional linking relation edge, representing the relationship between the entities from n, may be traversed to a causing system component state or the system or the system component of the state if n is a system component state, or a functionally related or containing system component or a related system component state if n is a system component. As such, calling the set of nodes N', if N' is not empty, the graph traversal may continue in order to assemble the set A of action nodes with N' as N.

The present embodiment may include a complex traversal mechanism that incorporates weighting the nodes to continue the traversal with each causal or functional linking relation edge. One weighting scheme may include counting the number of paths through a given node, weighing the node by that count, and then continuing the traversal only with the most highly weighted node. Other weighting schemes may make use of connection strength annotations on the edges derived from the extraction process.

According to at least one embodiment, the graph-based knowledge recommendation program may utilize the relationship data in the graph-based knowledge resource to make inferences about the cause and derive inferences from the original technical literature describing the causal and function structures of a complex system. The causal chain reasoning may be based on system functional relations in which the recommended responses for corrective action are based on the extraction of information on the relations among complex systems and not only relations among the described events.

The present embodiment may include identifying the likely causal path through the graph-based knowledge resource from the observed system state to root case. According to at least one embodiment, since the graph-based knowledge recommendation program has a fundamental grasp of the complex system based on the technical documents, the graph-based knowledge recommendation program may react and incorporate additional information to resolve ambiguities in determining the appropriate recommended response.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a graph-based knowledge recommendation program 110a. The networked computer environment 100 may also include a server 112 that is enabled to run a graph-based knowledge recommendation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the graph-based knowledge recommendation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the graph-based knowledge recommendation program 110a, 110b (respectively) to recommend responses to emergent conditions. The graph-based knowledge recommendation method is explained in more detail below with respect to FIGS. 2-6.

Figure 2:
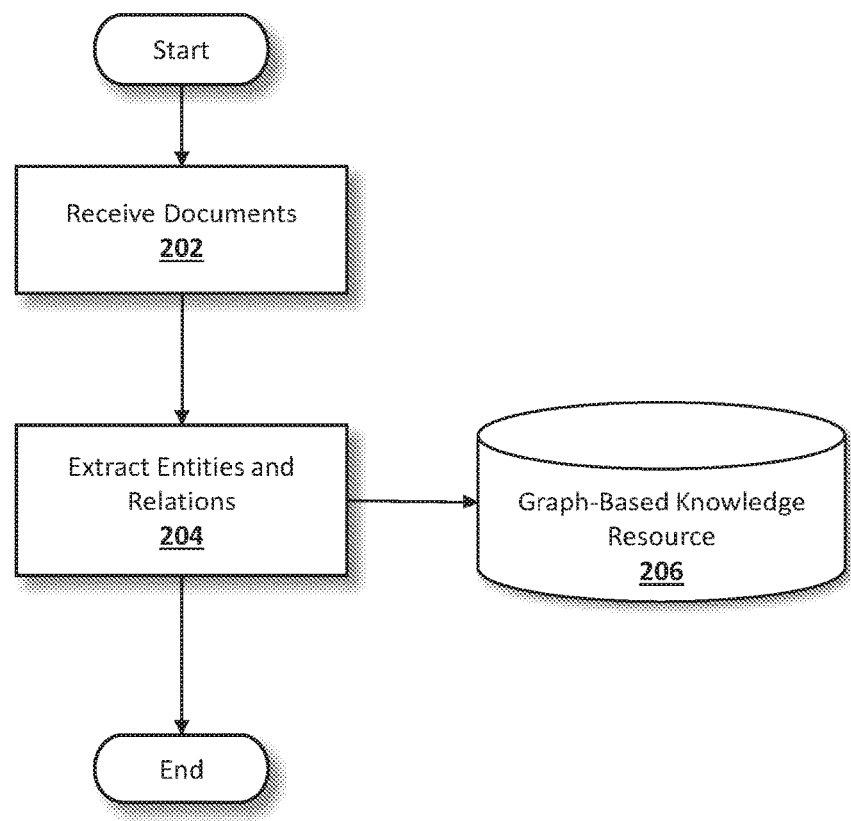
FIG. 2 is an operational flowchart illustrating a process for building a graph-based knowledge resource according to at least one embodiment.

Referring now to FIG. 2, an operational flowchart illustrating the exemplary graph-based knowledge resource building process 200 used by the graph-based knowledge recommendation program 110a and 110b according to at least one embodiment is depicted.

At 202, a corpus of documents is received. Documents, such as natural language technical documents (e.g., manuals, publications and brochures), instructional documents (e.g., manuals, publications and brochures), and technical drawings and diagrams describing and related to a single complex system within a domain, may be utilized to build the graph-based knowledge resource. The documents may be ingested in the graph-based knowledge recommendation program 110a, 110b by an operator manually compiling a large set of documents related to a complex system and uploading each bunch of documents into the graph-based knowledge recommendation program 110a, 110b. The manual compilation may allow for the operator to review each document and, if applicable, convert raw files into a particular format prior to the ingestion of the document into the graph-based knowledge recommendation program 110a, 110b. Each observed symptom of a problem in a complex system has many possible sources and causes, which along with potential remedies, may be identified in documents describing the solutions. As such, the documents may be entered into the graph-based knowledge recommendation program 110a, 110b to extract entities and relations expressed in natural language.

For example, the natural language source manuals, product handbooks, instruction manuals, scientific publications and product specifications related to classic 1960s automobiles are manually compiled, and then uploaded into the graph-based knowledge recommendation program 110a, 110b.

Next, at 204, the entities and relations are extracted from the corpus of documents, and the extracted entities and relations are utilized to generate a graph-based knowledge resource 206. The graph-based knowledge recommendation program 110a, 110b may parse through each sentence or figure included in the corpus of documents to identify system components, actions, and causal and functional relations (i.e., entities and relations) to enable inferences about the function of the complex system and possible recommended responses (i.e., actions/remedy) for problems related with the complex system. The graph-based knowledge recommendation program 110a, 110b may extract the identified entities and relations by utilizing a known external extraction technology that may implement known natural language processing methods. Once the entities and relations are identified and extracted from the corpus of documents, the graph-based knowledge recommendation program 110a, 110b may generate a graph-based knowledge resource 206 representing the network of relations among the entities that are included in the complex system using nodes and directed edges. The graph-based knowledge resource 206 summarizes the described or illustrated causal relations among the state of the components of the complex system, the described functional relations among system components, as well as recommended relations among the system component state, remedial actions (i.e., recommended responses) and contextual factors related to the complex system. As such, the graph-based knowledge resource 206 may store information related to the causal and functional relations associated with the complex system, which were derived from the corpus of documents. The storage of extracted entities and relations in the graph-based knowledge resource 206 will be described in greater detail below with respect to FIG. 4.

Continuing the previous example, the graph-based knowledge recommendation program 110a, 110b parses through each sentence of the entered natural language source manuals, product handbooks, instruction manuals, scientific publications and product specifications. From the entered documents, the graph-based knowledge recommendation program 110a, 110b extracts entities and relations that characterize the causal and functional relations of the complex system, as well as recommended relations, remedial actions (i.e., recommended responses) and contextual factors that influence how each of the entities affect each other. Each of the extracted entities and relations are analyzed and utilized to generate a graph-based knowledge resource 206 in which the entities and the relations between each entity are illustrated in a graphical representation (i.e., knowledge graph). The graphical representations (i.e., knowledge graphs) are stored in the graph-based knowledge resource 206 for retrieval when a user enters a query for a problem or symptoms of problems related to the classic 1960s automobiles.

Figure 3:
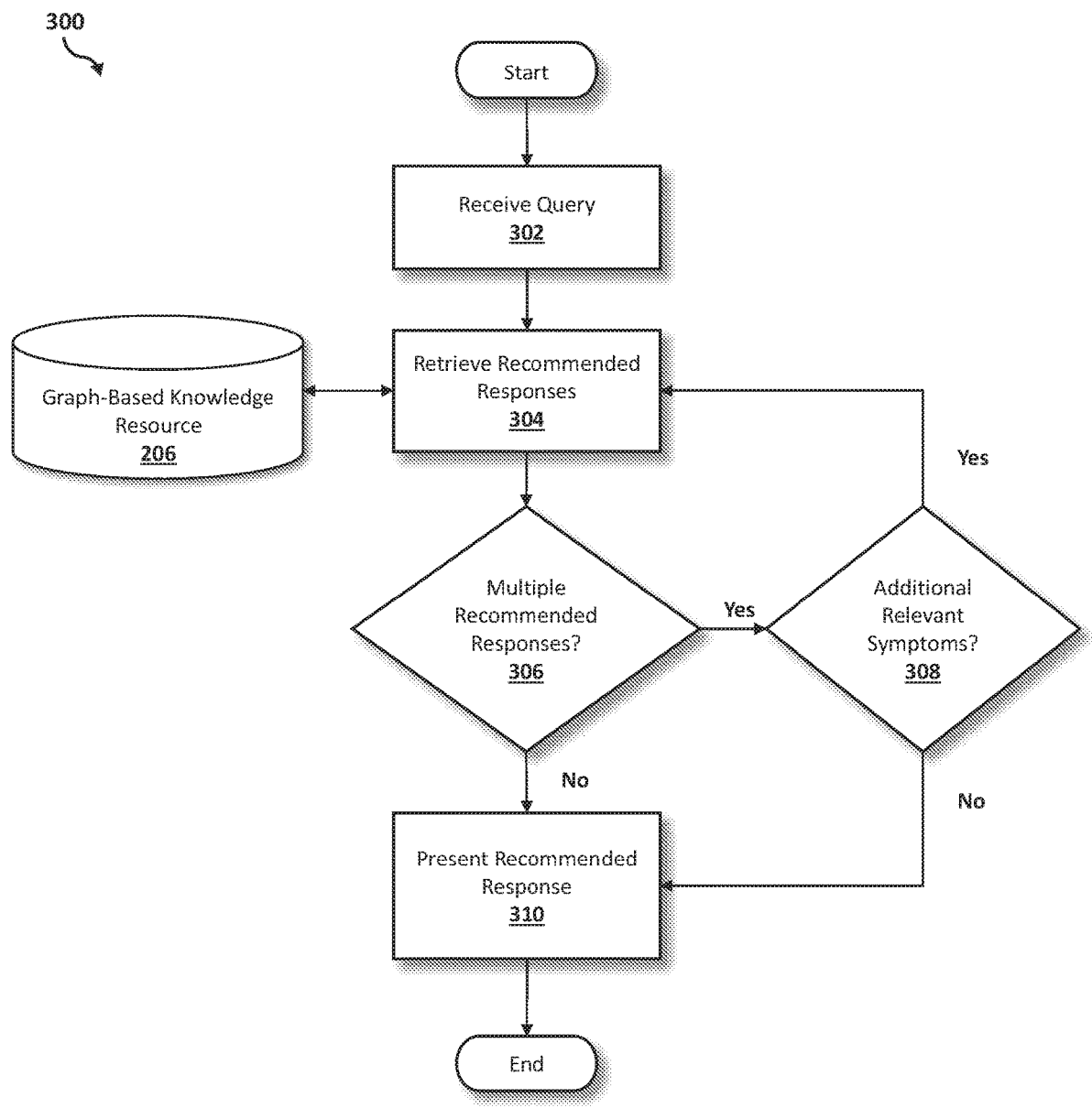
FIG. 3 is an operational flowchart illustrating a process for recommending responses to emergent conditions according to at least one embodiment.

Referring now to FIG. 3, an operational flowchart illustrating the exemplary process for recommending responses to emergent conditions 300 used by the graph-based knowledge recommendation program 110a and 110b according to at least one embodiment is depicted.

At 302, the graph-based knowledge recommendation program 110a, 110b receives a query from a user. Using a software program 108 on the user's device (e.g., user's computer 102), the query may be received as an input into the graph-based knowledge recommendation program 110a, 110b. The query may include the user identifying problems or symptoms of the problems, which corresponds with a set of query nodes of the system components in the graph-based knowledge resource 206. For example, an aircraft's pitot or static system failure can cause erratic and unreliable air speed indications. When a static system problem occurs, it affects the airspeed indicator, altimeter, and vertical speed indicator (VSI). In the absence of an alternate static source in an unpressurized aircraft, the pilot could break the glass on the VSI because the glass does not affect instrument flight. Breaking the glass provides both the altimeter and airspeed indicator, which are sources of static pressure. The pilot, however, may be cautious since breaking the glass may cause additional instrument errors. The following table is a list of identified relations:

System Component: Pitot system, Static system, Airspeed Indicator, Instrumentation system
System Component State: Pitot system failure, static system failure, Unreliable airspeed indicator
State-of: Pitot system failure is a state of the pitot system, etc.
Part-of: airspeed indicator is part of the instrumentation system
Causal Relation: Pitot system failure cause unreliable airspeed indicator
Functional Relation: Static system functionally connected to airspeed indicator
Context: Unpressurized aircraft
Action: breaking glass on VSI
Remedial relation: breaking glass on VSI remediates static system failure in context unpressurized aircraft Continuing the example, the pilot enters into the graph-based knowledge recommendation program 110a, 110b a query on the rudder limit failure node, one of the symptoms of the problem, in the pressurized aircraft.

Next, at 304, the graph-based knowledge recommendation program 110a, 110b retrieves recommended responses. The received query may be entered into the graph-based knowledge resource 206 to retrieve as output at least one recommended response to the received query. Since the graph-based knowledge resource 206 may store a network of relations among the entities that makes up the complex system using nodes and directed edges, the graph-based knowledge resource 206 may include the recommended responses for the query as derived from the corpus of technical documents entered into the graph-based knowledge recommendation program 110a, 110b. Then, the graph-based knowledge recommendation program 110a, 110b may, using the query nodes as the origin of a graph traversal, traverse the causal and functional links of the graph-based knowledge resource 206 until a set of recommended responses are retrieved.

Continuing the previous example, the graph-based knowledge recommendation program 110a, 110b will trace through the graph-based knowledge resource 206 through the unreliable airspeed node to the static system failure node and consider the break glass on VSI remedy. An exemplary graph of the storage of extracted entities and relations in the graph-based knowledge resource 206 will be described in greater detail below with respect to FIG. 5.

However, the source manuals uploaded into the graph-based knowledge recommendation program 110a, 110b included additional information, such as the fact that the main cause of inaccurate airspeed indication is icing of the pitot tubes in the pitot system. The inaccurate airspeed may also impact performance of downstream systems like autopilot or limits on the range of rudder movement. A detailed exemplary graph of the storage of extracted entities and relations in the graph-based knowledge resource 206 will be described in greater detail below with respect to FIG. 6.

Continuing the example, since the unpressurized aircraft requirements are not met, the graph-based knowledge recommendation program 110a, 110b discards this remedy. As will be shown in FIG. 6, further tracing from the unreliable airspeed to the pitot system failure to the icing of pitot tubes results to the recommended remedy of heating the pitot tubes (i.e., Heat Tubes). In addition, the rudder limit failure is a state of the rudder limit system that is functionally related to the hydraulic system and hydraulic pressure loss, a state of the hydraulic system, is remediated by re-pressurizing the hydraulics. Therefore, the graph-based knowledge recommendation program 110a, 110b retrieves two recommended responses to the query.

At 306, the graph-based knowledge recommendation program 110a, 110b determines whether the graph-based knowledge resource 206 provided one recommended response or multiple recommended responses. The graph-based knowledge recommendation program 110a, 110b may retrieve at least one recommended response from the graph-based knowledge resource 206. Depending on whether the graph-based knowledge recommendation program 110a, 110b retrieves multiple recommended responses, the graph-based knowledge recommendation program 110a, 110b may prompt the user to provide additional relevant symptoms at 308, or present the recommended response to the user at 310.

If the graph-based knowledge recommendation program 110a, 110b determines that there are multiple recommended responses to the received query at 306, then the graph-based knowledge recommendation program 110a, 110b will determine if there are specific additional relevant symptoms to the problem present at 308. The graph-based knowledge recommendation program 110a, 110b may prompt such additional relevant symptoms from the user (e.g., via dialog box) on the screen. The dialog box may prompt the user as to whether a specific additional relevant symptom previously excluded from the received query is present. Under the prompt, there may be "Yes" and "No" buttons. If the user clicks the "Yes" button, then the dialog box may disappear, or the graph-based knowledge recommendation program 110a, 110b may continue to prompt the user as to whether another additional relevant symptom may be present. If the user clicks the "No" button, then the dialog box may disappear, or the graph-based knowledge recommendation program 110a, 110b may continue to prompt the user as to whether another additional relevant symptom may be present.

Continuing the previous example, since the graph-based knowledge recommendation program 110a, 110b retrieved two recommended responses (i.e., heating the pitot tubes and re-pressurizing the hydraulics) the graph-based knowledge recommendation program 110a, 110b prompts the pilot for additional relevant symptoms. A dialog box appears on the screen and prompts the pilot on whether the autopilot disengage state remains the same. The pilot proceeds to click "Yes." The dialog box, then, disappears.

If the graph-based knowledge recommendation program 110a, 110b determines that the user provides additional relevant symptoms at 308, then the graph-based knowledge recommendation program 110a, 110b may return to retrieve recommended responses at 304. The graph-based knowledge recommendation program 110a, 110b may traverse the graph-based knowledge resource 206 to determine whether the additional relevant symptoms may eliminate some of the multiple recommended responses. The additional relevant symptoms may provide additional information to determine the specific recommended response to solve the query presented from the multiple recommended responses generated by the graph-based knowledge resource 206.

Continuing the previous example, since the pilot provided the additional relevant symptom of the autopilot disengage, then the graph-based knowledge recommendation program 110a, 110b returns to retrieve recommended responses at 304. The graph-based knowledge recommendation program 110a, 110b searches the graph-based knowledge resource 206 to eliminate one of the two recommended responses to present to the pilot in response to the received query. Based on the information included in the graph-based knowledge resource 206, the graph-based knowledge recommendation program 110a, 110b narrows down the recommended responses to heating the pitot tubes, and eliminates re-pressurizing the hydraulics. Therefore, the graph-based knowledge recommendation program 110a, 110b presents the recommended response of heating the pitot tubes to the received query by the pilot at 310.

If, however, the graph-based knowledge recommendation program 110a, 110b determines that one recommended response was retrieved at 306, there are no additional relevant symptoms at 308, or the additional relevant symptoms presented at 308 were not dispositive, then the graph-based knowledge recommendation program 110a, 110b will present the recommended response at 310.

Without the user providing dispositive additional relevant symptoms at 308, the graph-based knowledge recommendation program 110a, 110b may be unable to determine the specific recommended response. Therefore, the graph-based knowledge recommendation program 110a, 110b may present the multiple recommended responses previously generated for the user to determine the corrective action that may solve the query presented.

Continuing the previous example, if the pilot clicked "No" in response to the question regarding whether the autopilot remains the same and the graph-based knowledge recommendation program 110a, 110b was unable to provide any dispositive additional relevant symptoms to the user, then the graph-based knowledge recommendation program 110a, 110b will present both recommended responses (i.e., heating the pitot tubes and re-pressurizing the hydraulics) to the user.

If only one recommended response to the received query at 306, then, at 310, the graph-based knowledge recommendation program 110a, 110b will present the recommended response retrieved from the graph-based knowledge resource 206 to the user. The presented recommended response may include a corrective action to solve the problem in the complex system based on the query received by the user. Continuing the previous example, if the graph-based knowledge recommendation program 110a, 110b retrieved only one recommended response to the rudder limit failure in the pressurized aircraft, then the one recommended response would have been presented to the user.

In another embodiment, the graph-based knowledge recommendation program 110a, 110b may prompt the user to determine if additional relevant symptoms may be present at 308 in which the graph-based knowledge recommendation program 110a, 110b may prompt the user (e.g., via dialog box) as to whether there are additional relevant symptoms previously excluded from the received query. Under the prompt, there may be "Yes" and "No" buttons. If the user clicks the "Yes" button, then the dialog box may expand for the user to include a brief explanation of the additional relevant symptoms. Once the user includes the brief explanation of the additional relevant symptoms, then the user may click the "Submit" button at the bottom of the dialog box. Then, the dialog box may disappear. If the user clicks the "No" button, then the dialog box may disappear.

In another embodiment, the graph-based knowledge recommendation program 110a, 110b may include an "Additional Symptoms" button at the bottom of the screen. The "Additional Symptoms" button may permit the user to enter additional relevant symptoms into the graph-based knowledge recommendation program 110a, 110b, even if the graph-based knowledge recommendation program 110a, 110b has yet to prompt the user with directed questions on additional relevant symptoms.

In another embodiment, if the graph-based knowledge recommendation program 110a, 110b retrieves no recommended responses at 304, then the graph-based knowledge recommendation program 110a, 110b may present to the user that there are no recommended responses, at 310, for the received query. The user may modify the query and may return to 302 to enter a new query into the graph-based knowledge recommendation program 110a, 110b.

Figure 4:
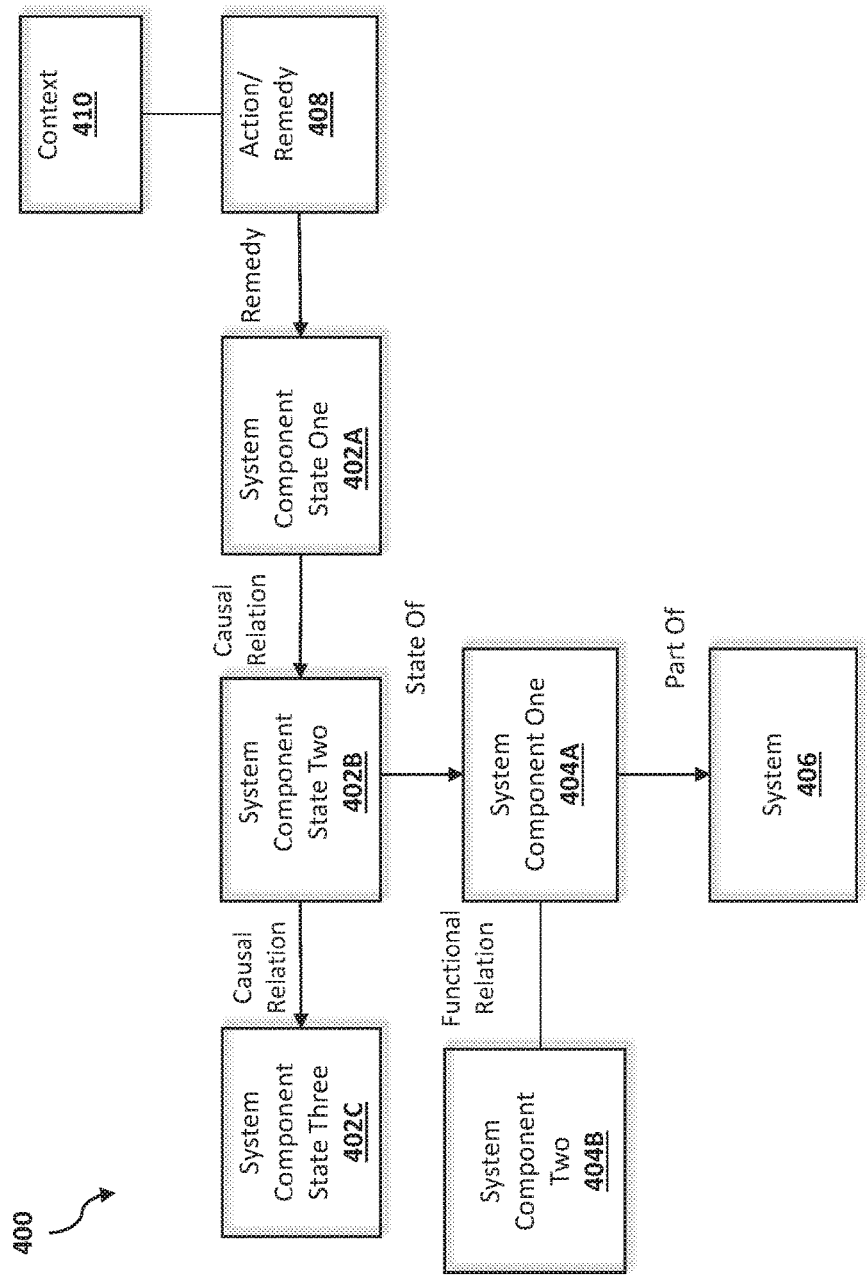
FIG. 4 is an operational flowchart illustrating an exemplary graph related to the storage of extracted entities and relations in a graph-based knowledge resource according to at least one embodiment.

Referring now to FIG. 4, an exemplary graph 400 illustrating the storage of extracted causal and functional relations in the graph-based knowledge resource 206 is depicted. As shown, the nodes are the extracted system component states, system components or related systems, and the edges or links (i.e., connections between the nodes) are the relations between the nodes. System component state one 402A, system component state two 402B, and system component state three 402C are the symptoms entered as input into the graph-based knowledge recommendation program 110a, 110b by the user. Each of the system components states 402A-402C are causally connected (i.e., based on a cause and effect relationship) in which the system component state one 402A may be the cause and the effect may be system component state two 402B, and the effect of system component state two 402B may be system component state three 402C. The system component one and two at 404A-404B are the parts of the system directly associated with the entered symptoms at 402A-402C. The system component one and two 404A-404B are functionally connected in which the functions of the system components at 404A-404B are directly related and affected by each other. Both system components 404A-404B are related to a system 406. If the system component states are present, based on the system components and associated system, then the action/remedy 408 may resolve the problem related to context 410 presented.

Figure 5:
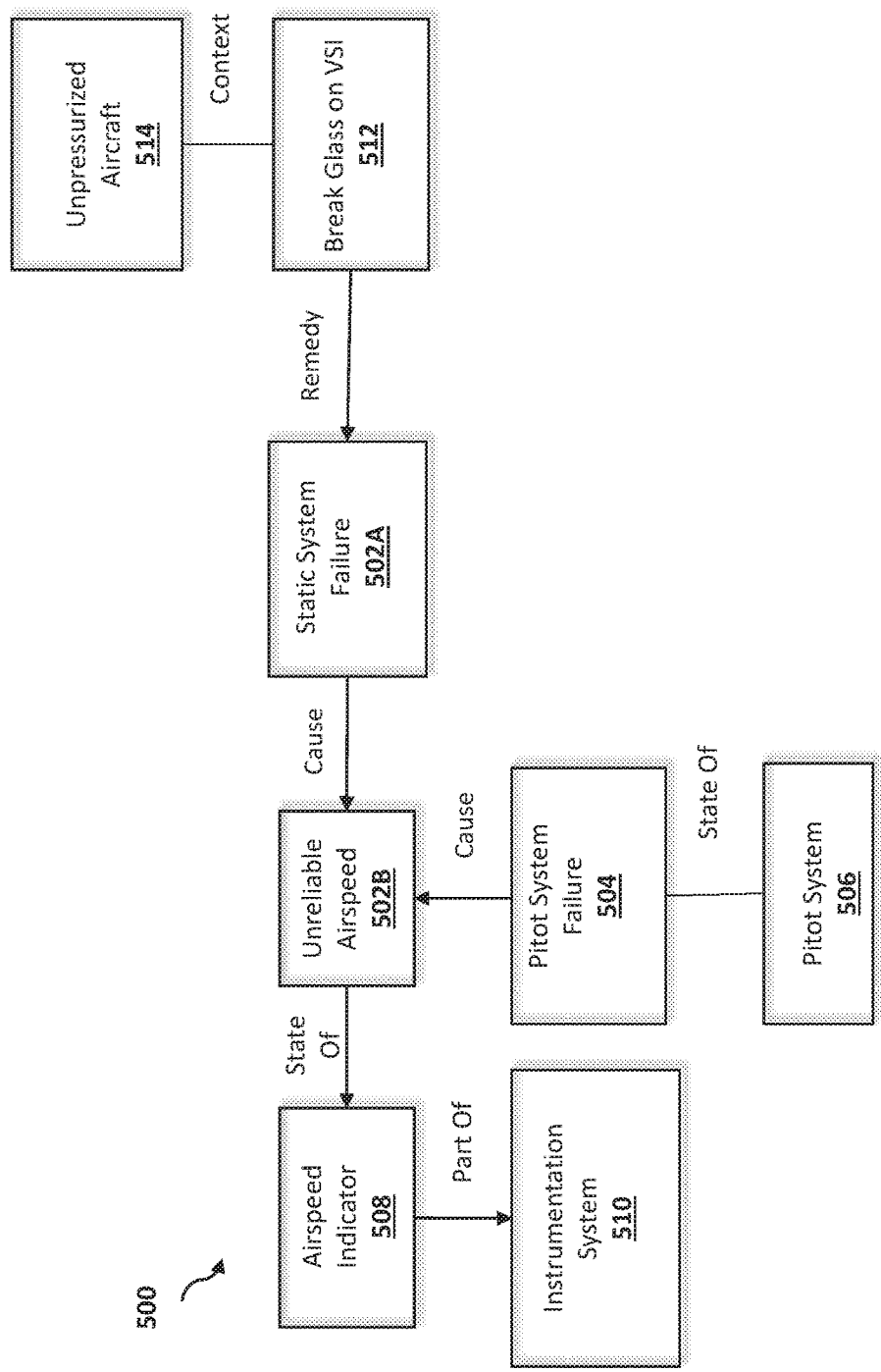
FIG. 5 is an operational flowchart illustrating an exemplary unpressurized aircraft graph stored in the graph-based knowledge resource according to at least one embodiment.

Referring now to FIG. 5, an exemplary representation illustrating the storage of information in the graph-based knowledge resource 206 for an unpressurized aircraft graph 500 associated with FIG. 3 is depicted. The symptoms of the aircraft-related problem (i.e., system component state) are static system failure 502A and unreliable airspeed 502B (i.e., unreliable airspeed indicator). The unreliable airspeed 502B may be caused by a failure of the pitot system failure 504, which is a state of the pitot system 506. Additionally, the unreliable speed 502B is a state of the airspeed indicator 508, which is a part of the instrumentation system 510. If both symptoms, static system failure 502A and unreliable airspeed 502B, are present, based on the relations between the respective systems, the appropriate remedy is to break the glass on the vertical speed indicator (VSI) 512 to resolve the problem in the context of an unpressurized aircraft 514.

Figure 6:
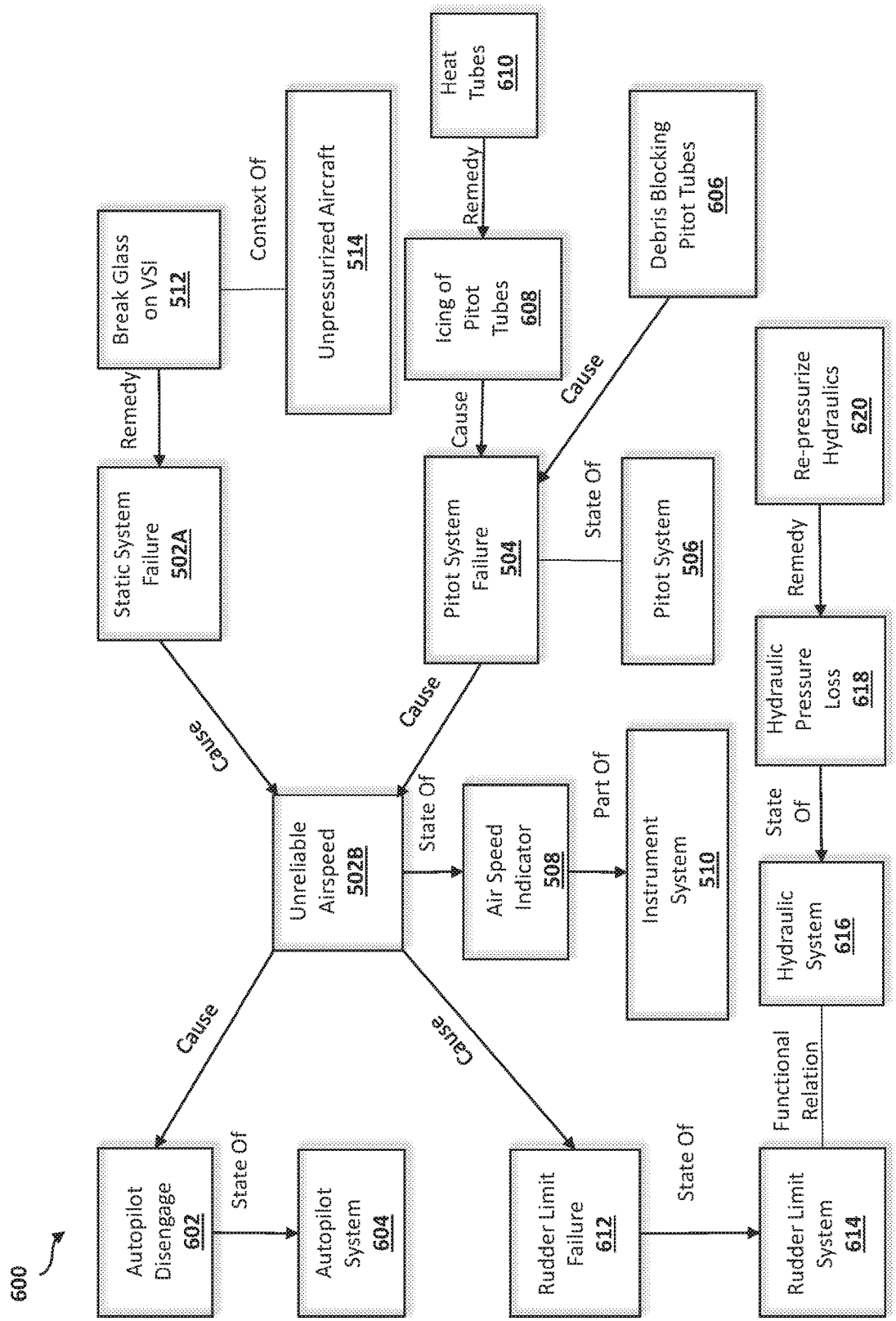
FIG. 6 is an operational flowchart illustrating an exemplary detailed unpressurized aircraft graph stored in the graph-based knowledge resource according to at least one embodiment.

Referring now to FIG. 6, an exemplary representation illustrating the storage of information in the graph-based knowledge resource 206 for a detailed unpressurized aircraft graph 600 associated with FIG. 3 is depicted. In addition to the system component states, systems and remedy presented in FIG. 5, FIG. 6 presents additional system component states, system components, systems and remedies to resolve the same problem based on the same symptoms (i.e., system component states) presented by the user. The unreliable airspeed 502B may be caused by the autopilot disengage 602, which is a state of the autopilot system 604. In addition, the pitot system failure 504 may be caused by debris blocking the pitot tubes 606 or icing of the pitot tubes 608 in which heating the pitot tubes 610 remediates the symptom of icing of the pitot tubes 608. Another cause of the unreliable airspeed 502B may be a rudder limit failure 612, which is a state of the rudder limit system 614. The rudder limit system 614 is functionally connected to the hydraulic system 616, which is a state of hydraulic pressure loss 618. If the additional symptom (i.e., system component states) of hydraulic pressure loss 618 is present, then re-pressurizing the hydraulics 620 may remediate the problem in the context of an unpressurized aircraft 514.

In the present embodiment, the system components (i.e., symptoms), system component states, relations (e.g., causal or functional), and systems, generated from the extracted entities and relations that are utilized to populate the knowledge graphs stored in the graph-based knowledge resource 206, may be leveraged to determine the recommended responses for emergent conditions.

It may be appreciated that FIGS. 2-6 provide only an illustration of one embodiment and do not imply any limitations with regard to how different embodiments may be implemented. Many modifications to the depicted embodiment(s) may be made based on design and implementation requirements. Similarly, the graph-based knowledge recommendation program 110a, 110b may not be limited to the field of aviation, which has been chosen as an illustration. In fact, the graph-based knowledge recommendation program 110a, 110b may be applied to any complex technical system.

Figure 7:
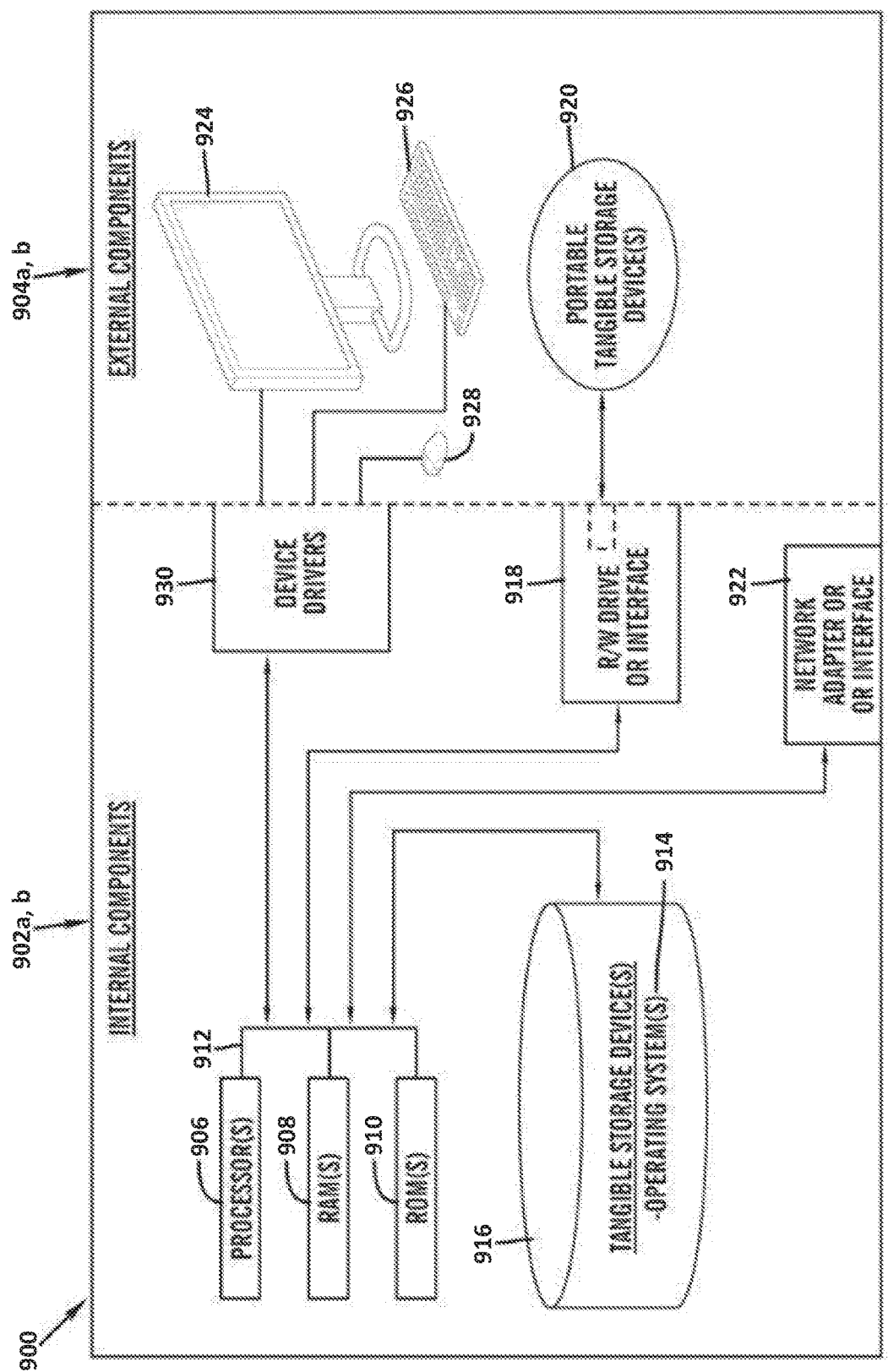
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 7. Each of the sets of internal components 902a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the graph-based knowledge recommendation program 110a in client computer 102, and the graph-based knowledge recommendation program 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the graph-based knowledge recommendation program 110a and 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the graph-based knowledge recommendation program 110a in client computer 102 and the graph-based knowledge recommendation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the graph-based knowledge recommendation program 110a in client computer 102 and the graph-based knowledge recommendation program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
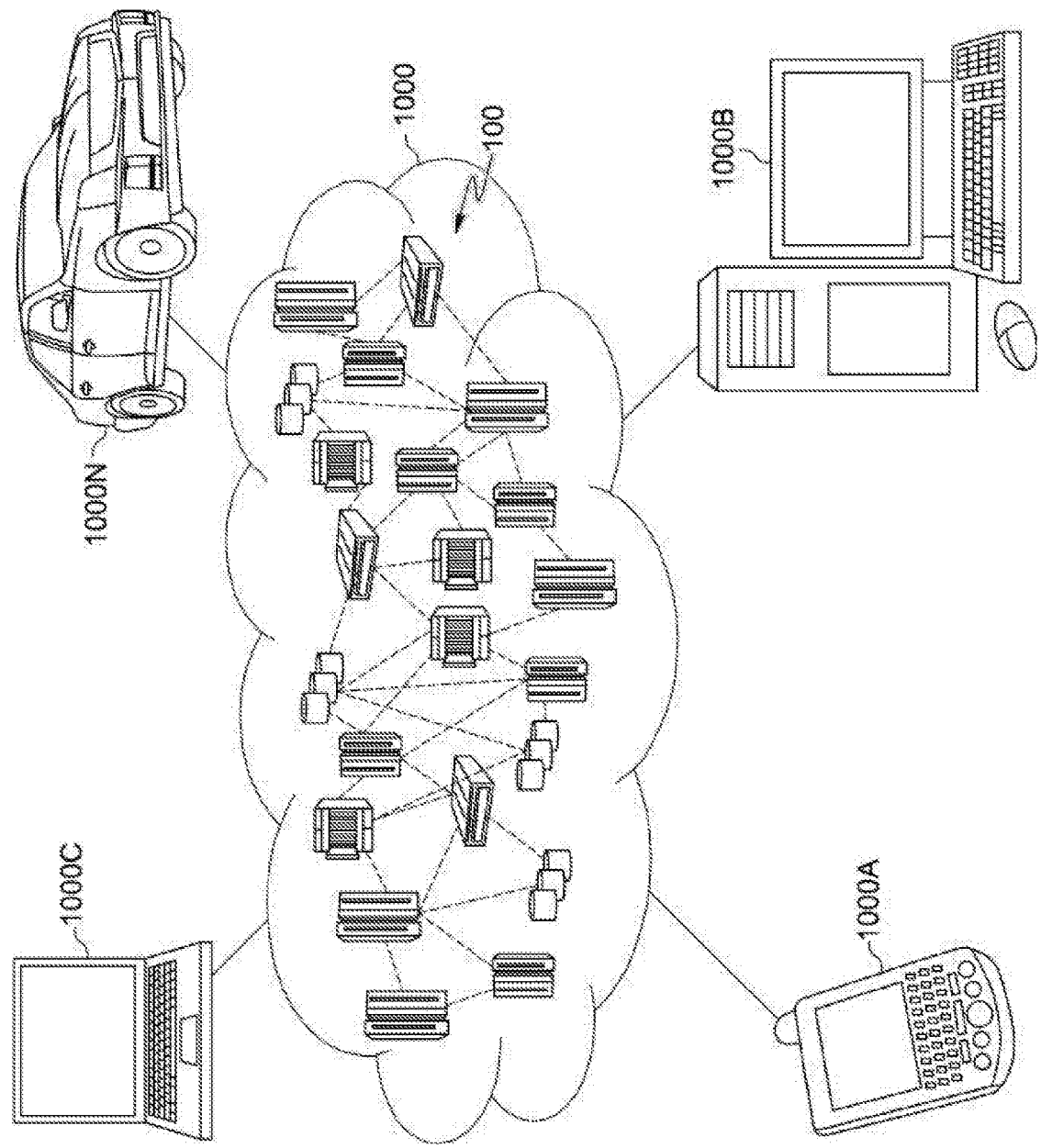
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
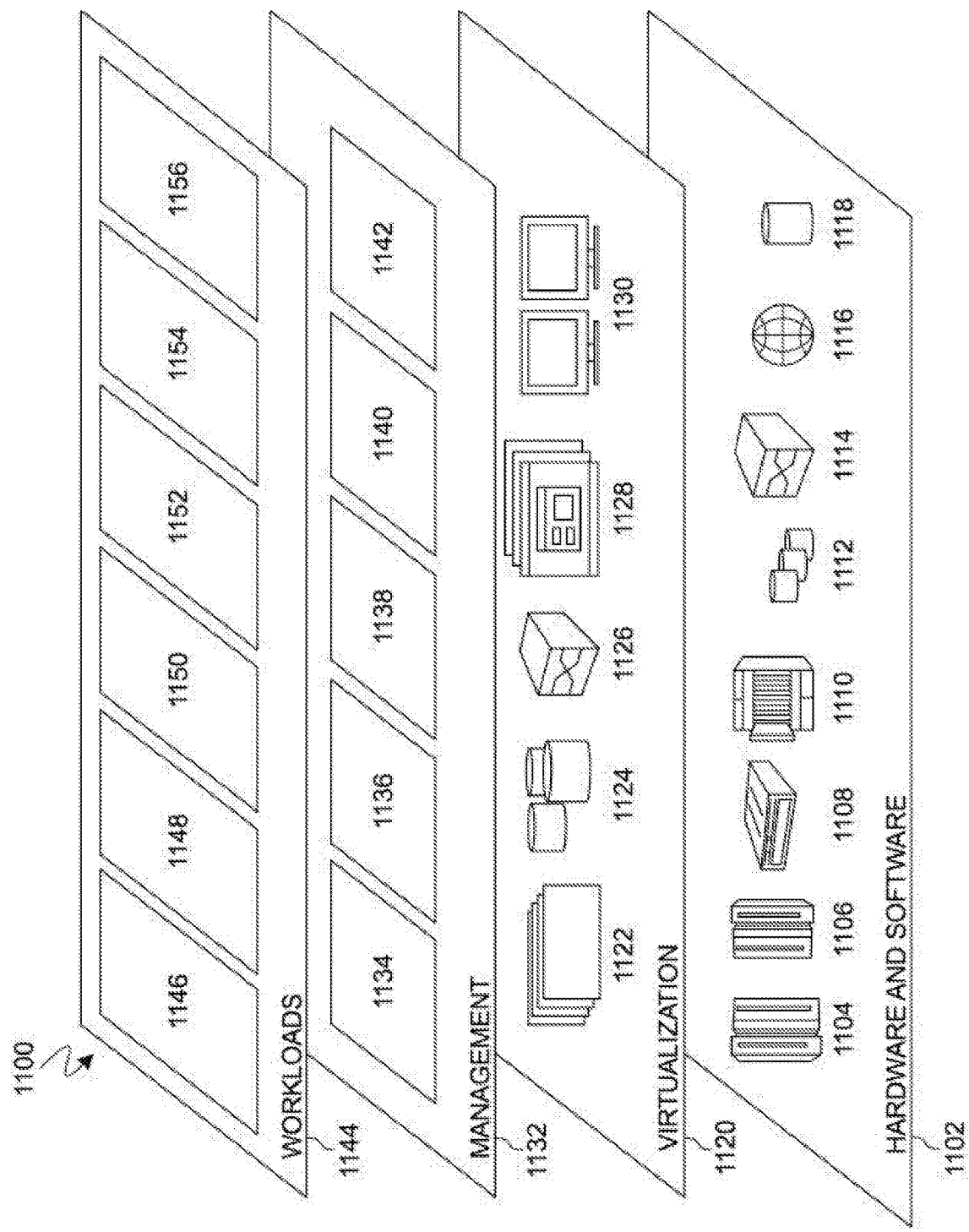
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and graph-based knowledge recommendation 1156. A graph-based knowledge recommendation program 110a, 110b provides a way to recommend responses to emergent conditions using a functional and causal graph-based knowledge resource 206.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for recommending responses to emergent conditions, the method comprising:

receiving a plurality of unstructured technical source documents for a domain wherein the domain is related to a complex system, wherein the received plurality of unstructured technical source documents contain natural language text;

extracting a plurality of entities and a plurality of relations from the received plurality of unstructured technical source documents using natural language processing;

identifying a plurality of system components, a plurality of actions, a plurality of causal relations, a plurality of functional relations, and a plurality of solutions for encoded problems from the extracted plurality of entities and the extracted plurality of relations;

generating a knowledge graph from the identified plurality of system components, the identified plurality of actions, the identified plurality of causal relations, the identified plurality of functional relations, and the plurality of solutions for encoded problems wherein the generated knowledge graph includes a plurality of nodes and a plurality of edges connecting the plurality of nodes, and wherein the plurality of nodes are weighted based on a number of paths through a node;

storing the generated knowledge graph in a graph-based knowledge resource;

receiving a query from a user, wherein the received query includes one or more symptoms associated with an emergent condition of the complex system, in real-time;

determining a plurality of actionable recommended responses for the received query from the plurality of entities and the plurality of relations stored in the graph-based knowledge resource based on the one or more symptoms associated with the emergent condition of the complex system in real-time and traversing the generated knowledge graph, wherein the traversal is based on a node weight associated with the node;

incorporating additional information, from the user, to resolve ambiguities in determining the plurality of actionable recommended responses; and presenting the retrieved plurality of actionable recommended responses to the user, in response to the one or more symptoms associated with the emergent condition of the complex system in real-time.

2. The method of claim 1, wherein determining the plurality of actionable recommended responses for the received query from the plurality of entities and the plurality of relations stored in the graph-based knowledge resource, further comprises:

retrieving the plurality of actionable recommended responses for the received query based on the retrieved plurality of entities and the retrieved plurality of relations stored in the graph-based knowledge resource;

querying the user for a plurality of additional relevant symptoms for the received query based on the retrieved plurality of entities and the retrieved plurality of relations stored in the graph-based knowledge resource;

receiving the queried plurality of additional relevant symptoms from the user;

identifying a plurality of additional relevant symptoms by utilizing the graph-based knowledge resource;

retrieving an actionable recommended response from the graph-based knowledge resource based on the identified plurality of additional relevant symptoms; and presenting the retrieved actionable recommended response to the user.

3. The method of claim 1, wherein determining the plurality of actionable recommended responses for the received query from the plurality of entities and the plurality of relations stored in the graph-based knowledge resource, further comprises:

retrieving the plurality of actionable recommended responses for the received query from the retrieved plurality of entities and the retrieved plurality of relations stored in the graph-based knowledge resource;

determining there are no additional relevant symptoms for the received query; and presenting the retrieved plurality of actionable recommended responses to the user.

4. The method of claim 1, wherein determining the plurality of actionable recommended responses for the received query from the plurality of entities and the plurality of relations stored in the graph-based knowledge resource, further comprises:

retrieving one actionable recommended response for the received query from the plurality of entities and the plurality of relations stored in the graph-based knowledge resource; and presenting the one actionable recommended response to the user.

5. The method of claim 1, further comprising:

determining the domain is associated with a technical device; and determining that the received query is a problem related to the technical device.

* * * * *